(12) United States Patent
Kunihiro et al.

(10) Patent No.: US 9,434,130 B2
(45) Date of Patent: Sep. 6, 2016

(54) ELASTIC LAMINATE SHEET

(75) Inventors: Kioshi Kunihiro, Kanagawa (JP);
Shinji Kimura, Kanagawa (JP);
Yoshihisa Matsuda, Kanagawa (JP);
Naoyuki Toriumi, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/004,559

(22) PCT Filed: Mar. 6, 2012

(86) PCT No.: PCT/US2012/027882
§ 371 (c)(1),
(2), (4) Date: Oct. 24, 2013

(87) PCT Pub. No.: WO2012/125344
PCT Pub. Date: Sep. 20, 2012

(65) Prior Publication Data
US 2014/0045401 A1 Feb. 13, 2014

(30) Foreign Application Priority Data
Mar. 11, 2011 (JP) ................................. 2011-054225

(51) Int. Cl.
*B32B 5/02* (2006.01)
*B32B 27/12* (2006.01)
*B32B 7/14* (2006.01)
*B32B 27/30* (2006.01)
*B32B 5/14* (2006.01)

(52) U.S. Cl.
CPC ............. *B32B 5/022* (2013.01); *B32B 5/142* (2013.01); *B32B 7/14* (2013.01); *B32B 27/12* (2013.01); *B32B 27/302* (2013.01); *B32B 2250/40* (2013.01); *B32B 2262/0253* (2013.01); *B32B 2262/0276* (2013.01); *B32B 2262/12* (2013.01); *B32B 2262/14* (2013.01); *B32B 2307/51* (2013.01); *B32B 2307/54* (2013.01); *B32B 2307/5825* (2013.01); *B32B 2307/718* (2013.01); *B32B 2535/00* (2013.01); *B32B 2555/02* (2013.01); *Y10T 442/659* (2015.04); *Y10T 442/679* (2015.04)

(58) Field of Classification Search
CPC ....... B32B 27/30; B32B 25/10; B32B 27/12; B32B 5/26; A61F 13/64; A61F 13/491; A61F 13/15; B29C 65/00; D04H 1/56
USPC .......................... 442/327, 328, 381, 394–399
See application file for complete search history.

(56) References Cited

U.S. PATENT DOCUMENTS

| | | | |
|---|---|---|---|
| 6,069,097 A | 5/2000 | Suzuki et al. | |
| 6,313,372 B1 | 11/2001 | Suzuki | |
| 7,462,573 B2 | 12/2008 | Tsujiyama et al. | |
| 2003/0162458 A1 | 8/2003 | Tsujiyama et al. | |
| 2011/0004180 A1* | 1/2011 | Fossum et al. | 604/385.24 |

FOREIGN PATENT DOCUMENTS

| | | |
|---|---|---|
| EP | 0 989 222 A1 | 3/2000 |
| JP | 2001-105520 | 4/2001 |

(Continued)

*Primary Examiner* — Arti Singh-Pandey

(57) ABSTRACT

An elastic laminate sheet with excellent elasticity while maintaining softness and favorable appearance including surface feel and the like, an article containing this elastic laminate sheet, a laminate sheet where a high elasticity laminate portion is the elastic laminate sheet, and an article containing the laminate sheet.

8 Claims, 8 Drawing Sheets

(56) References Cited

FOREIGN PATENT DOCUMENTS

| | | |
|---|---|---|
| JP | 2007/230180 A | 9/2007 |
| JP | 2009-143150 | 7/2009 |
| WO | 95/04654 A1 | 2/1995 |
| WO | WO 01/54900 A1 | 8/2001 |
| WO | WO 03/047488 A1 | 6/2003 |
| WO | WO 2009/073474 A2 | 6/2009 |

\* cited by examiner

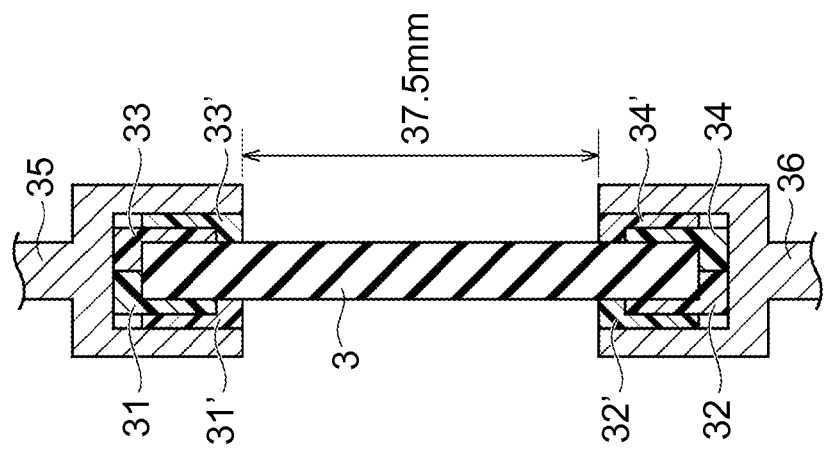
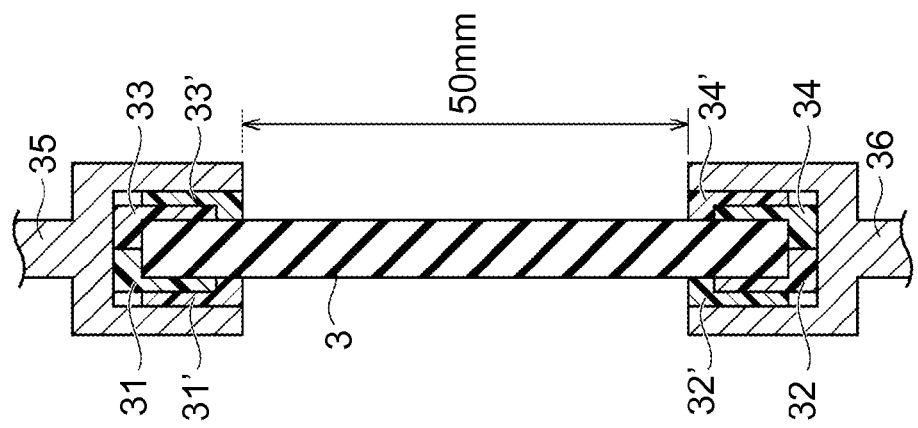
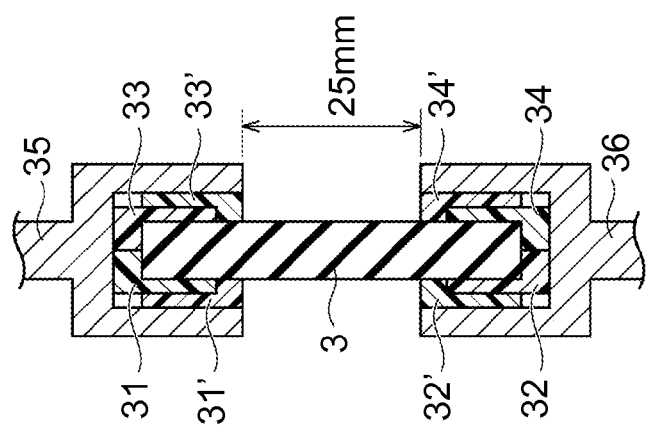

ELASTIC LAMINATE SHEET

FIELD OF INVENTION

The present invention relates to an elastic laminate sheet and to an article containing this sheet.

BACKGROUND

Various elastic members have been proposed for use in diapers and other hygiene products. WO 2001/054900 describes an extrusion bonded nonwoven elastic film laminate body, WO 2003/047488 describes an absorbent article, and U.S. Pat. No. 6,313,372 describes a composite elastic body with multilevel elongation properties.

SUMMARY OF THE INVENTION

Conventional elastic members tend to become hard when attempting to achieve excellent elasticity, and there is some need for further improvement in the overall suppleness of elastic members. When elastic members are used in hygienic articles and the like, the elastic member may directly contact the skin, so in addition to having excellent elasticity, the entire elastic member must also be soft, have favorable surface feel, and have favorable surface appearance.

The present invention can provide an elastic laminate sheet or a laminate sheet that has excellent elasticity while maintaining favorable softness, surface feel, and appearance, as well as an article having this elastic laminate sheet or laminate sheet.

One aspect of the present invention provides an elastic laminate sheet comprising a laminate body having an elastomer film and a nonwoven material, wherein a 50% return load of the elastomer film after elongating 100% two times is 0.8 N/25 mm or higher; and the elastomer film and the nonwoven material are uniformly bonded with a bonding strength of 4 N/25 mm or less.

In another aspect, the laminate body is a laminate body with nonwoven material provided on both sides of an elastomer film, and a basis weight of the elastomer film can be 60 g/m$^2$ or less.

In yet another aspect, the present invention can be a laminate sheet comprising a laminate body having an elastomer film and a nonwoven material provided on at least one surface of the elastomer film, wherein the laminate sheet contains a low elasticity laminate portion and a high elasticity laminate portion; and in the high elasticity laminate portion, a 50% return load of the elastomer film after elongating 100% two times is 0.8 N/25 mm or higher, and the elastomer film and the nonwoven material are uniformly bonded with a bonding strength of 4 N/25 mm or less. Note, both the low elasticity laminate portion and the high elasticity laminate portion are a part of a laminate body having the elastomer film and the nonwoven material, and constitute a part of the laminate sheet.

Furthermore, in another aspect of the laminate sheet, the laminate body is a laminate body with a nonwoven material provided on both surfaces of the elastomer film, and a basis weight of the elastomer film can be 60 g/m$^2$ or less.

Furthermore, the present invention provides an article comprising the elastic laminate sheet or the laminate sheet.

BRIEF DESCRIPTION OF THE DRAWINGS

FIG. 3 (*b*) is a front view illustrating an example of an elastomer film which is reattached to a sheet material after a first 100% elongation in order to perform a second 100% elongation;

FIG. 5 (*a*) is a cross section view illustrating a condition where an elastomer film after a first 100% elongation is attached, (b) is a cross section view illustrating the 100% elongated condition, and (c) is a cross section view illustrating a condition when returned to 50% of the 100% elongated condition;

DETAILED DESCRIPTION OF THE INVENTION

Figure 1:
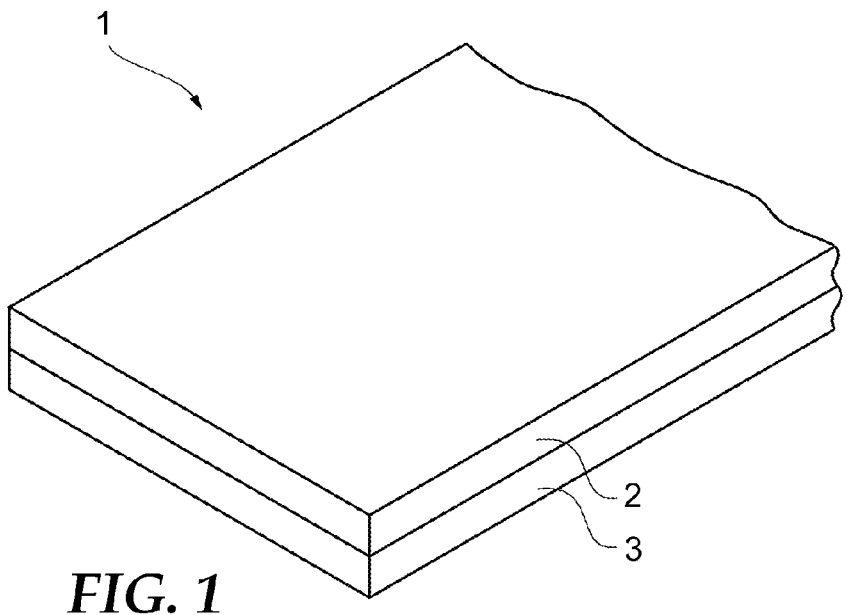
FIG. 1 is a perspective view of an elastic laminate sheet according to a first embodiment.

Preferred embodiments of the present invention are described below in detail while referring to the drawings, but the elastic laminate sheet of the present invention is not restricted to the following embodiments. Note that in the following descriptions, identical or similar constituents are assigned the same numerical reference and a duplicate description is omitted.

FIG. 1 is a perspective view of an elastic laminate sheet according to a first embodiment. An elastic laminate sheet 1 according to the first embodiment comprises a laminate body having an elastomer film 3 and a nonwoven material 2, and the nonwoven material 2 is provided on one surface of the elastomer film 3.

Figure 2:
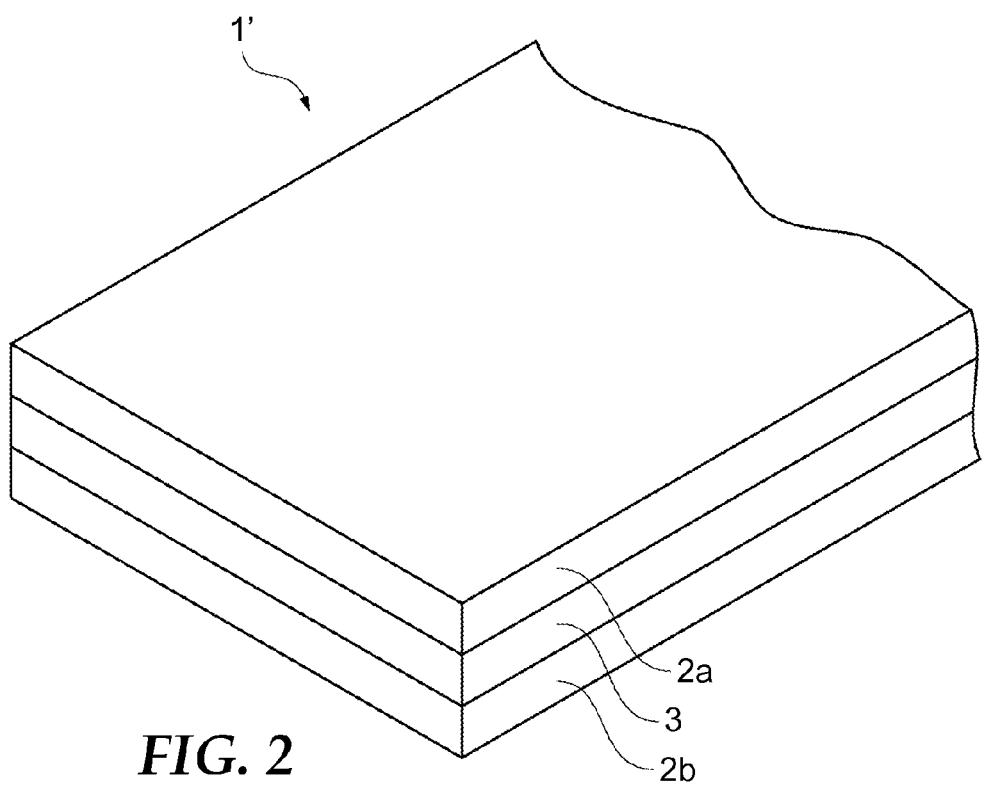
FIG. 2 is a perspective view of an elastic laminate sheet according to a second embodiment.

FIG. 2 is a perspective view of an elastic laminate sheet according to a second embodiment. An elastic laminate sheet 1' according to the second embodiment comprises a laminate body having an elastomer film 3, a first nonwoven material 2*a*, and a second nonwoven material 2*b*. The first nonwoven material 2*a* is provided on one surface of the elastomer film 3, and the second nonwoven material 2*b* is provided on another surface. The first nonwoven material 2*a* and the second nonwoven material 2*b* can be the same material or different materials.

With the elastic laminate sheets 1 and 1', a 50% return load after independently elongating the elastomer film 3 two times is 0.8 N/25 mm or higher. Furthermore, the elastomer film 3 and the nonwoven material 2, or the elastomer film 3 and the first nonwoven material 2a and the second nonwoven material 2b are uniformly bonded on a contact surface, and a bonding strength of each is 4 N/25 mm or less.

The phrase "50% return load after elongating 100% two times" (hereinafter simply referred to as "return load") refers to a load at 50% elongation when returning after twice 100% elongating an elastomer film 3 obtained by peeling the first nonwoven material 2a and the second nonwoven material 2b from the elastic laminate sheet 1' or by peeling the nonwoven material 2 from the elastic laminate sheet 1. If peeling the nonwoven material 2 from the elastic laminate sheet 1 or peeling the first nonwoven material 2a and the second nonwoven material 2b from the elastic laminate sheet 1' is difficult, all portions of the nonwoven material do not necessarily need to be completely removed from the elastomer film 3 and the nonwoven material can be removed to the extent that the surface of the elastomer film 3 is not damaged (such as by applying adhesive tape to the nonwoven material 2 or to the first nonwoven material 2a and the second nonwoven material 2b and then peeling the adhesive tape from the nonwoven material, and the like). A specific measurement method is described below while referring to FIG. 3 through FIG. 5.

Figure 3A:
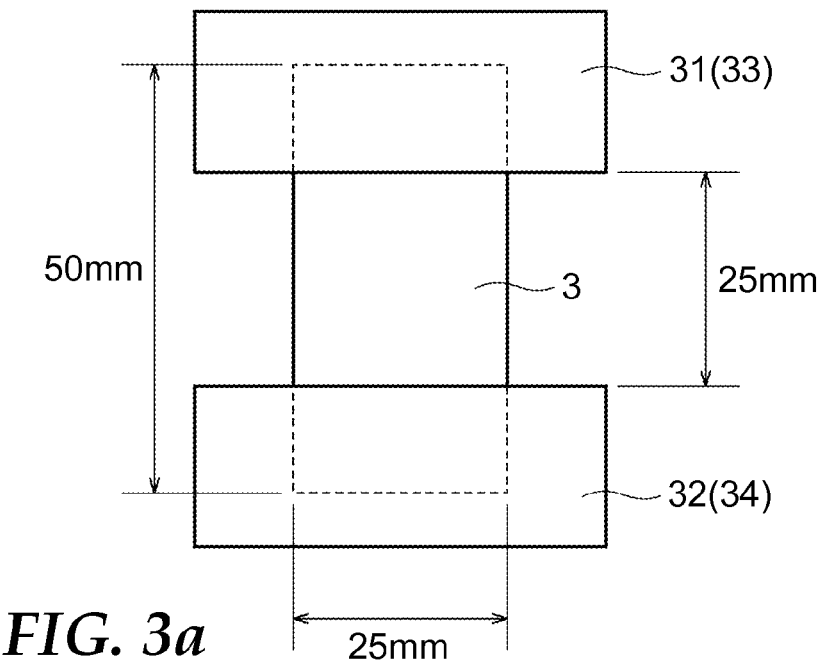
FIG. 3 (*a*) is a front view illustrating an example of an elastomer film prior to measuring a 50% return load after elongating 100% two times.
Figure 3B:
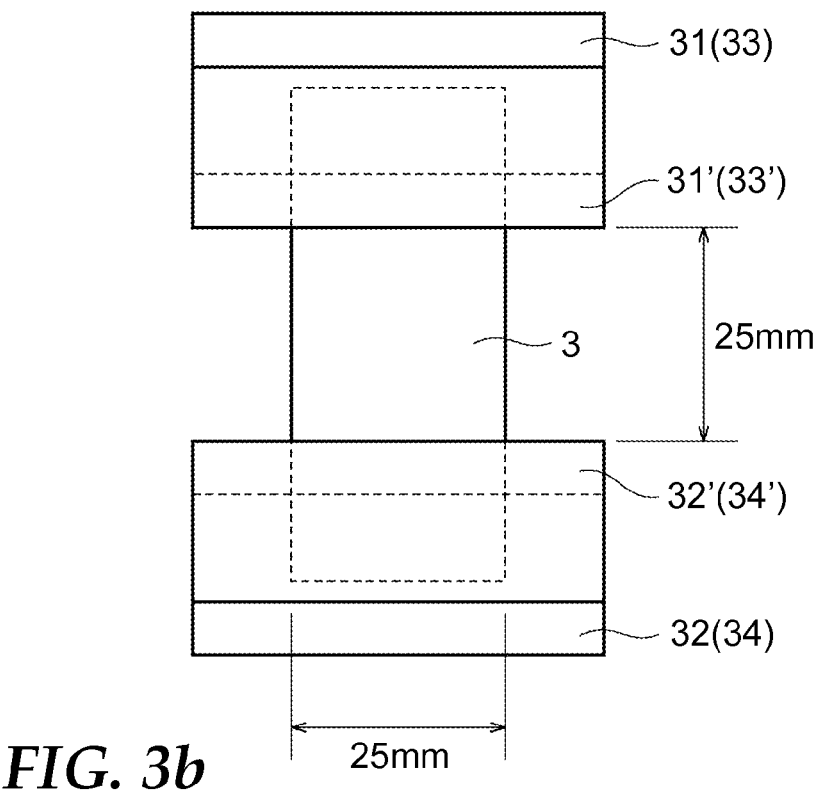
Figure 4A:
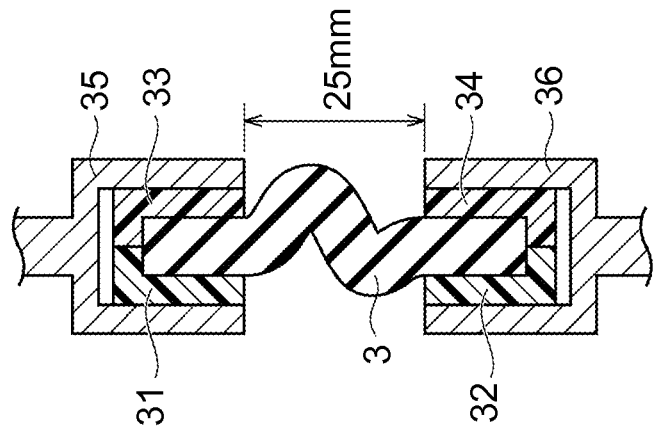
FIG. 4 (*a*) is a cross section view illustrating a condition where the elastomer film is attached, (b) is a cross section view illustrating a 100% elongated condition, and (c) is a cross section view illustrating a condition when returned to original condition.
Figure 4B:
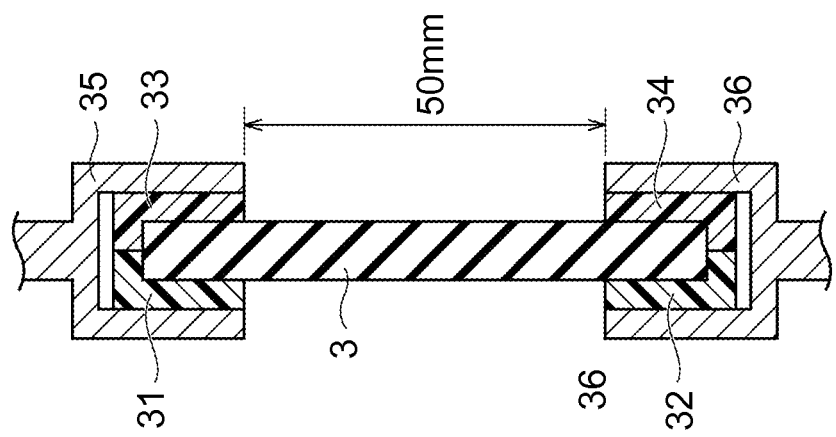
Figure 4C:
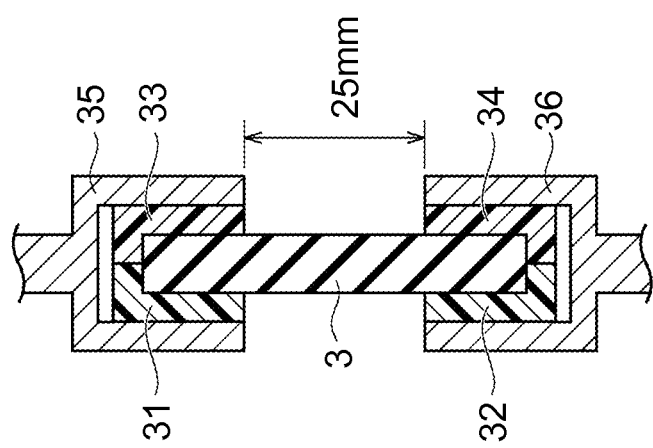

FIG. 3 (*a*) is a front view illustrating an example of an elastomer film prior to measuring the 50% return load after elongating 100% two times, and FIG. 3 (*b*) is a front view illustrating an example of an elastomer film 3 which is reattached after a first 100% elongation of the elastomer film 3 by a sheet material in order to perform a second 100% elongation. FIG. 4 is a cross section view illustrating an example of a process for performing a first 100% elongation, where (a) is a cross section view illustrating a condition where the elastomer film is attached, (b) is a cross section view illustrating a 100% elongated condition, and (c) is a cross section view illustrating a condition when returned to original condition. FIG. 5 is a cross section view illustrating an example of a process for performing a second 100% elongation, where (a) is a cross section view illustrating a condition where an elastomer film 3 after a first 100% elongation is attached, (b) is a cross section view illustrating the elastomer film 3 in a 100% elongated condition, and (c) is a cross section view illustrating a condition when returned to 50% of the 100% elongated condition.

The "50% return load after elongating 100% two times" is measured as described below. First, as illustrated in FIG. 3 (*a*), both end portions of the elastomer film 3 are sealed using a sealing material 31 (33) and 32 (34). Next, as illustrated in FIG. 4 (*a*), the elastomer film 3 that is a measurement sample is attached to chucks (attaching portions) 35 and 36 of a tensile strength tester that are spaced apart from each other by 25 mm (such that stress is not applied to the measurement sample when attached). Continuing, as illustrated in FIG. 4 (*b*), the measurement sample is elongated by 25 mm at a rate of 300 mm/minute, and then as illustrated in FIG. 4 (*c*), the chucks are returned to an original chuck position at a rate of 300 mm/minute. When the chucks have returned to the original position, attachment to the chucks is once released and the measurement sample is removed, and then as illustrated in FIG. 3 (*b*), the elastomer film 3 is sealed once again, using the sealing material 31' (33') and 32' (34') which is applied onto the sealing material 31 (33) and 32 (34). The measurement sample is again attached by the chucks (attaching portions) of the tensile strength tester that are spaced 25 mm apart from each other such that a load is not applied to the measurement sample when attached (FIG. 5 (*a*)). The reattached measurement sample is elongated by 25 mm at a rate of 300 mm/minute (FIG. 5 (*b*)), held for one second at that elongation, and then the chucks are returned to position such that an elongation is 12.5 mm at a rate of 300 mm/minute (FIG. 5 (*c*)), and the measured load is measured at this time. Note, the test is performed at 23±2° C.

When the elastic laminate sheet 1 or 1' is used in an ear portion of a disposable diaper where a mechanical fastener is attached, a lower limit of the return load of the elastomer film 3 is preferably 0.8 N/25 mm or higher, more preferably 0.9 N/25 mm, from a perspective of appropriately tracking shape and movement of a body. If the return load is less than 0.8 N/25 mm, there will be problems such as formation of gaps between the sheet and the body, and the sheet will easily shift from a predetermined position on the body. On the other hand, an upper limit for the return load is preferably 1.4 N/25 mm or less, more preferably 1.2 N/25 mm or less, from a perspective of suppressing over tightening on the body.

"Bonding strength" refers to a peel strength obtained in a peel test at a peel rate of 500 mm/minute at a temperature of 23±2° C. A specific measurement method is described below while referring to FIG. 6 and FIG. 7.

Figure 6:
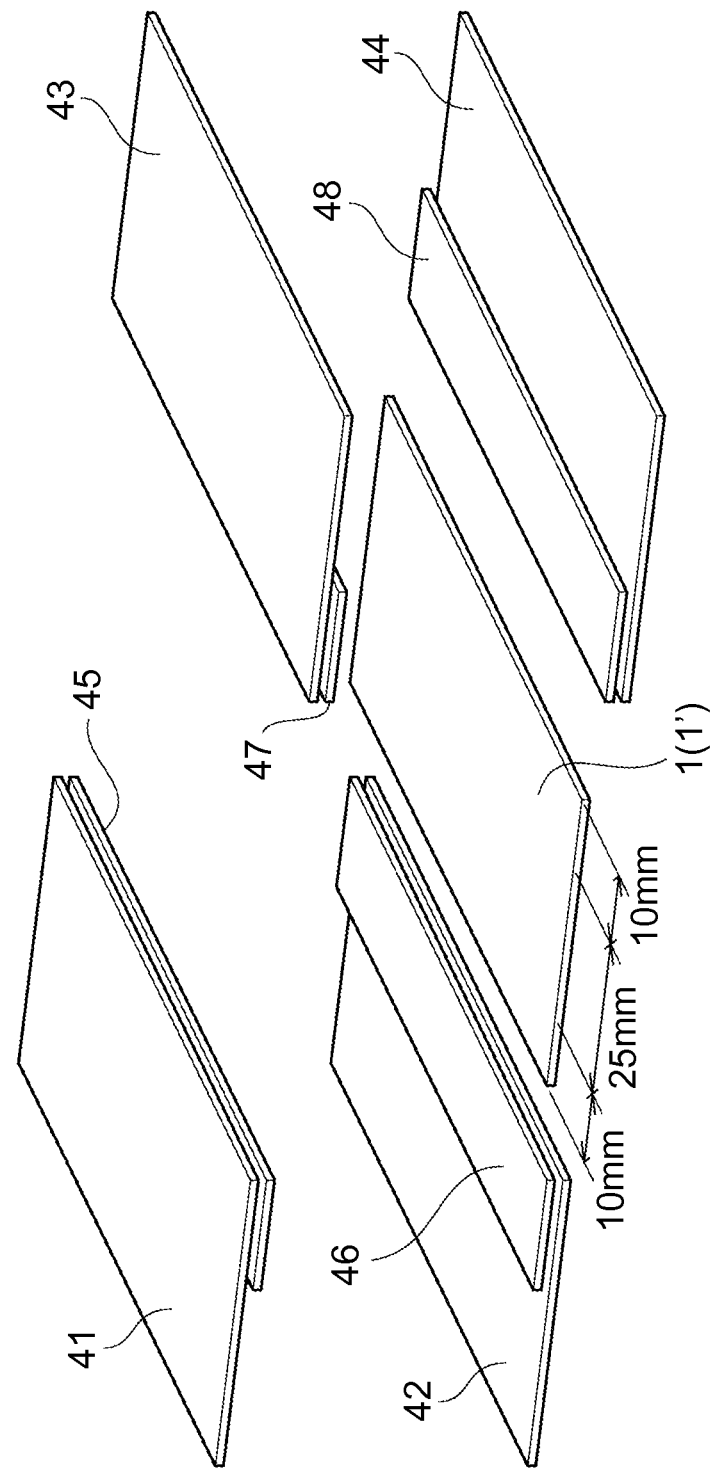
FIG. 6 is a perspective view illustrating an example of a fixture for elongating the elastic laminate sheet prior to measuring a peel strength.

FIG. 6 is a perspective view illustrating an example of a fixture for elongating the elastic laminate sheet 1 or 1' prior to measuring the peel strength. As illustrated in FIG. 6, one end of the elastic laminate sheet 1 or 1' is fastened by clamping with mechanical fasteners 45 and 46 and interposed between stainless steel panels 41 and 42. Another end is fastened by clamping with mechanical fasteners 47 and 48 and interposed between stainless steel panels 43 and 44. The elastic laminate sheet 1 or 1' is elongated in this fastened condition. Next, the elongated sheet is cut in a shape of a rectangle with predetermined dimensions. Next, for a case of the elastic laminate sheet 1, an entire elastomer film 3 of the rectangular test sample obtained is masked with masking tape, and for a case of elastic laminate sheet 1', an entire second nonwoven material 2b of the rectangular test sample obtained is masked with masking tape, to make a measurement sample for peel strength measurement.

Figure 7B:
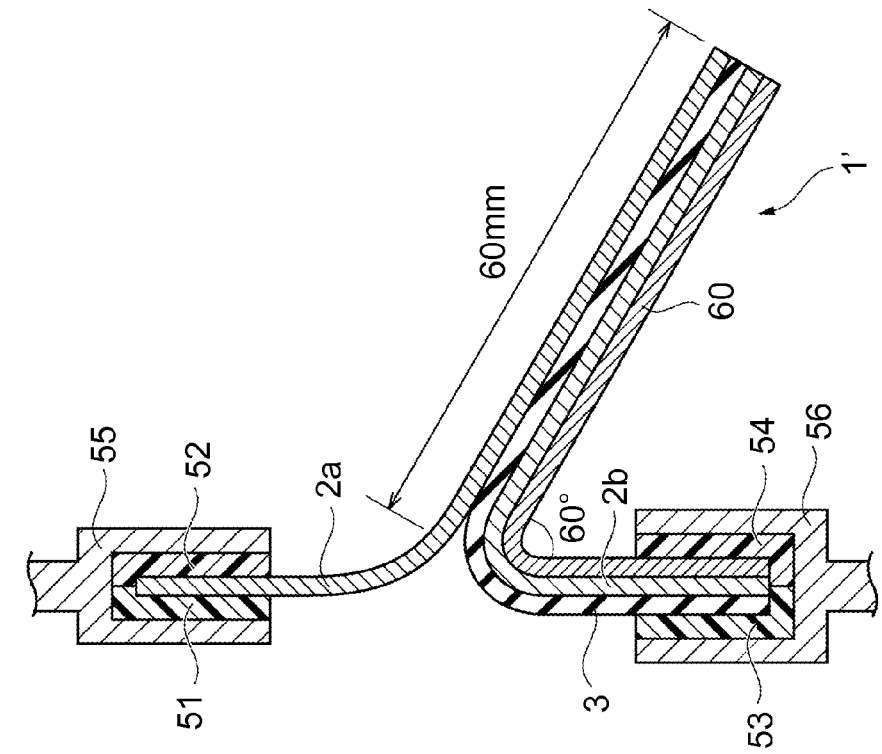
FIG. 7 (*a*) is a front view illustrating an example of a measurement method for the peel strength of the elastic laminate sheet according to the second embodiment, and (b) is a cross section view where the front view is cut along line VIIb-VIIb.
Figure 7A:
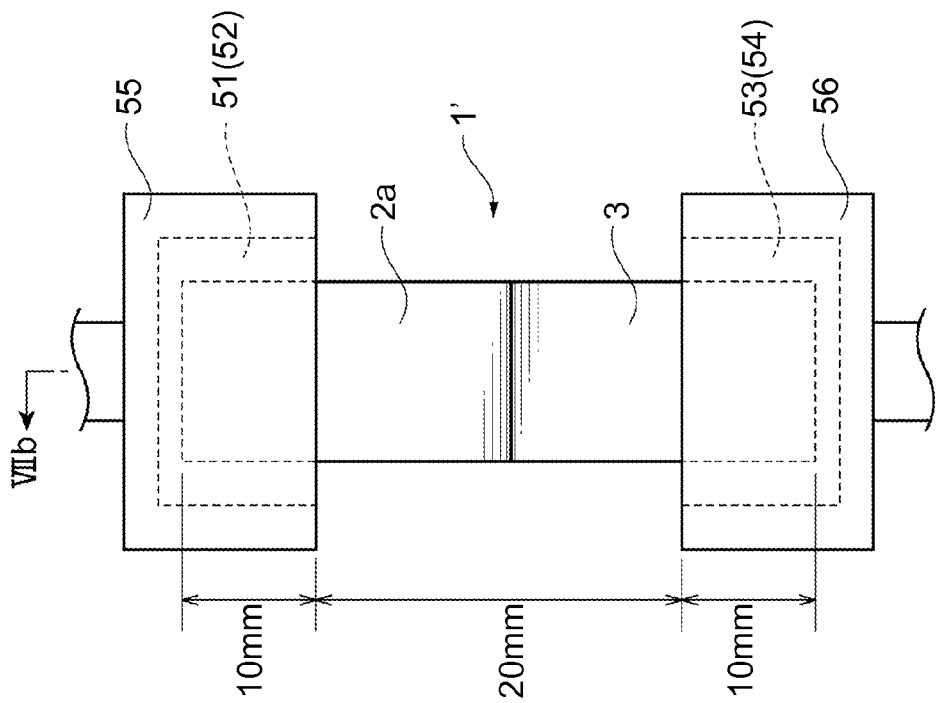

FIG. 7 (*a*) is a front view illustrating an example of a measurement method for the peel strength of the elastic laminate sheet 1', and (b) is a cross section view where the front view is cut along line VIIb-VIIb. As illustrated in these figures, the first nonwoven material 2a is peeled from a certain length of elastomer film 3 of the measurement sample obtained. At this time, one end of the measurement sample is secured with filament tape 51 and 52, and another end is peeled while secured by filament tape 53 and 54. In this case, a width of the first nonwoven material 2a (or nonwoven material 2 for the case of the elastic laminate sheet 1) that is secured by the filament tape 51 and 52 is made to be the same as a width of the original measurement sample. Furthermore, the first nonwoven material 2a secured by the filament tape 51 and 52 is attached to a top chuck 55 of the tensile strength tester, and a three layer structure portion containing elastomer film 3/second nonwoven material 2b/masking tape 60 (or a two layer structure portion containing elastomer film 3/masking tape, for the case of the elastic laminate sheet 1) is attached to a bottom chuck 56. Herein, the peel strength measurement is performed while always maintaining an angle of approximately 60° between a portion of the measurement sample in a condition where the first nonwoven material 2a (or nonwoven material 2 for the case of the elastic laminate sheet 1) has not yet been peeled and a portion of the three layer structure (or portion of the two layer structure for the case of the elastic laminate sheet 1) that is attached to the bottom chuck 56. Note, for the case of the elastic laminate sheet 1', the peel strength is measured for the second nonwoven material 2b by performing a same peel process and peel test as for the first nonwoven material 2a side.

The peel strength is calculated by the following equation. In other words, the peel strength is an integrated average from a peeled length a position to a peeled length b position (b>a). The integrated average is expressed by the following equation (1) for a case where the peel strength is expressed by f(x).

[Equation 1]

$$\langle f \rangle_{(a,b)} = \frac{\int_a^b f(x)\,dx}{b-a} \quad (1)$$

As described above, the peel strength can be measured even if a portion of the nonwoven material remains on the surface of the elastomer film after peeling.

The phrase "uniformly bonded" in the present invention refers to continuous bonding with a same bonding force the elastomer film 3 and fibers of the nonwoven material 2 in the elastic laminate sheet 1, or the elastomer film 3 and fibers of the first nonwoven material 2a and the second nonwoven material 2b in the elastic laminate sheet 1'. A structure is formed where an entire surface of the elastomer film 3 is covered by the nonwoven material 2 or by the first nonwoven material 2a and the second nonwoven material 2b. For example, a form where the elastomer film 3 and the nonwoven material 2 or the first nonwoven material 2a and the second nonwoven material 2b are locally strongly bonded in regions of a convex portion pattern of a nip roller by extrusion laminating using a nip roller with a convex portion pattern such as approximately 1 mm dots or lines on the surface, or a form where the elastomer film 3 and the nonwoven material 2 or the first nonwoven material 2a and the second nonwoven material 2b of an elastic laminate sheet 1 or 1' are locally bonded by an adhesive coated at intervals, as is seen with conventional elastic laminate sheets, would not be considered to be the definition of "uniformly bonded". In the present invention, the elastomer film 3 and the nonwoven material 2 (or the first nonwoven material 2a and the second nonwoven material 2b) are uniformly bonded.

The peel strength between the elastomer film 3 and the nonwoven material 2 or the first nonwoven material 2a and the second nonwoven material 2b is preferably 4 N/25 mm or less, more preferably 3 N/25 mm or less, from a perspective of enhancing elasticity and softness of an entire elastic member. On the other hand, a lower limit of the peel strength is preferably 2 N/25 mm or higher from a perspective of controlling peeling of the nonwoven material 2 or the first nonwoven material 2a and the second nonwoven material 2b from the elastomer film 3 due to repeated stretching and contracting, while maintaining a texture of the nonwoven material.

The elastomer film 3 included in the elastic laminate sheet 1 or 1' is described. The elastomer film 3 is not particularly restricted so long as the film has elasticity and expresses adhesion when melted by heating, but an elastomer film with (1) low permanent elongation, (2) high breaking strength, and (3) low melt index (MI) is preferable from a perspective of providing softness and excellent elasticity to the elastic laminate sheet 1 or V.

The elastomer that forms this type of elastomer film can be a styrene based thermoplastic elastomer, an olefin based thermoplastic elastomer (TPO), vinyl chloride based thermoplastic elastomer, urethane based thermoplastic elastomer, ester based thermoplastic elastomer, or amide based thermoplastic elastomer.

Typically, an elastomer film with a permanent elongation of 30% or less (preferably 20% or less, more preferably 10% or less) as measured by JIS K6301, and a breaking strength of 7 MPa or higher (preferably 13 MPa or higher, more preferably 20 MPa or higher) as measured by JIS K6251-93 is preferable. Furthermore, an elastomer film that is preferably used has a melting index as measured by JIS K7210-76 (200° C., 5 kg, 10 min.) of 100 or lower (preferably 50 or lower, more preferably 30 or lower) for styrene based thermoplastic elastomers, or has a melting index (230° C., 16 kg, 10 min.) of 50 or lower (preferably 30 or lower, more preferably 10 or lower) for olefin based thermoplastic elastomers.

Herein, the thermoplastic elastomer has a hard segment and a soft segment, and primarily the hard segment has a function of molecular constraint. For a styrene based thermoplastic elastomer, the hard segment can be polystyrene, and the soft segment can be polybutadiene, polyisoprene, or hydrogenated products thereof (constraint model is a frozen phase). For an olefin based thermoplastic elastomer, the hard segment can be polyethylene or polypropylene, and the soft segment can be an ethylene propylene-based rubber (EPDM, EPM, EEM) or a hydrogenated (styrene) butadiene rubber (constraint model is a crystalline phase).

For a vinyl chloride based thermoplastic elastomer, the hard segment can be crystalline polyvinyl chloride and the soft segment can be noncrystalline polyvinyl chloride or NBR (constraint model is the crystalline phase), and for a urethane based thermoplastic elastomer, the hard segment can be a urethane structure, and the soft segment can be a polyester or polyether (constraint model is an hydrogen bond or crystalline phase). For an ester based thermoplastic elastomer, the hard segment can be a polyester and the soft segment can be a polyether or polyester (constraint model is the crystalline phase), and for an amide based thermoplastic elastomer, the hard segment can be a polyamide and the soft segment can be a polyester or polyether (constraint model is the hydrogen bond or crystalline phase).

The thermoplastic elastomer can be used alone or a blend of two or more elastomers, or can be used to form an interpenetrating polymer network (IPN). Furthermore, the elastomer can be manufactured by dynamic vulcanization.

First, the styrene based thermoplastic elastomer can be one of a variety of types of three component block polymer materials with an aromatic vinyl—conjugate diene (or one where a portion or all of the unsaturated bonds are hydrogenated)—aromatic vinyl block copolymer as a base structure. The vinyl monomer in the aromatic vinyl polymer is preferably styrene. Furthermore, examples of the monomer in the conjugate diene include 1,3-butadiene, isoprene, 2,3-dimethyl-1,3-butadiene, 2-chloro-1,3-butadiene, 1,3-pentadiene, and 1,3-hexandiene. A portion or all of the unsaturated bonds can be hydrogenated when used as styrene-based thermoplastic elastomer. Representative examples of the styrene-based thermoplastic elastomer include styrene-isoprene-styrene block copolymer (SIS), styrene-ethylene butylene-styrene block copolymer (SEBS), styrene-butadiene-styrene block copolymer (SBS), styrene-ethylene propylene-styrene block copolymer (SEPS), styrene-ethylene ethylene/propylene-styrene block copolymer (SEEPS), and styrene-butadiene butylene-styrene block copolymer (SBBS). The styrene-based elastomer structure can be linear, radial, or star shaped.

The styrene-based thermoplastic elastomer can also include two component block polymers with an aromatic vinyl-conjugate diene (or one where a portion or all of the unsaturated bonds are hydrogenated) as a base structure. However, an amount of two component block polymer is preferably 10 weight % or less, more preferably 3 weight % or less, for a case where a weight of an entire styrene based thermoplastic elastomer component is 100 weight %, from a perspective of reducing the permanent elongation.

Furthermore, if SIS is used as the styrene based thermoplastic elastomer of the present invention, the ratio of styrene is preferably 35 weight % or higher, more preferably 40 weight % or higher, based on a total weight of SIS being 100 weight %. Furthermore, a ratio of two component block polymer in the styrene-based thermoplastic elastomer is preferably 10 weight % or less, more preferably 3 weight % or less, with a weight of all styrene-based thermoplastic elastomers, in other words a total amount of SIS and two component block polymer being 100 weight %. Note, a shape of the styrene domain is preferably a sphere structure or a cylinder structure, but a sphere structure is more preferable.

Examples of the SIS Block Copolymer Include:

Quintac SL-159 (melting index 20 or less (200° C., 5 kg, g/10 minutes), two component block polymer 1 weight % or less, styrene ratio 48 weight %), manufactured by Zeon Corporation, and a blend containing 75 weight % of Vector 4411 (melting index 40 (200° C., 5 kg, g/10 minutes), two component block polymer 1 weight % or less, styrene ratio 44 weight %) manufactured by DEXCO Polymers, and 25 weight % of D1117 (melting index 33 (200° C. 5 kg, g/10 minutes), two component block polymer 33 weight %, styrene ratio 17 weight %) manufactured by Kraton Polymers, and the like.

Next, examples of the olefin based thermoplastic elastomer include simple blend TPO, implanted TPO, dynamic vulcanized TPO, and the like. With implanted TPO, the ethylene ratio is preferably 14% or higher.

For the olefin-based elastomer, an olefin based elastomer block copolymer polymerized using a metallocene catalyst (VistaMaxx 6102, weight ratio ethylene content: 16%, melting index 3 (230° C., 2.16 kg, g/10 minutes) is also useful.

The elastomer film 3 can contain an additive such as a tackifier (adhesion promoter) or the like in addition to the polymer.

The tackifier preferably has favorable compatibility with the polymers. For example, the SIS copolymer can be rosin based, terpene based, petroleum based, or the like. Two or more types of tackifiers can also be used in combination.

Examples of commercial products that can be used include Pine Crystal (registered trademark) (product of Arakawa Chemical Industries, Ltd.) as a rosin type tackifier; YS Polystar (registered trademark) (product of Yasuhara Chemical) as a terpene type tackifier; and petroleum type tackifiers such as Wingtack Plus (registered trademark) (product of Cray Valley Co., Ltd.), Arcon (registered trademark) (product of Arakawa Chemical Industries, Ltd.), and the like.

An amount of tackifier can be suitably determined based on an application or the like of the elastic laminate sheet 1 or 1' obtained. In one aspect, the amount of tackifier can be between 0.1 and 10 weight %, based on a total amount of a raw material composition of the elastomer film 3.

The raw material composition of the elastomer film 3 can also contain various other additives (such as antioxidants, weathering agents, UV absorbers, colorants, inorganic fillers, oils, and the like).

A basis weight of the elastomer film 3 is preferably 60 $g/m^2$ or less, more preferably 50 $g/m^2$ or less, and even more preferably 45 $g/m^2$ or less from a perspective of softness and favorable appearance of the elastic laminate sheets 1 and 1'. On the other hand, the basis weight of the elastomer film 3 is preferably 20 $g/m^2$ or higher, and more preferably 30 $g/m^2$ or higher from a perspective of durability.

A thickness of the elastomer film 3 can be between approximately 5 and 100 μm, and either a single layer construction or a multilayer construction is acceptable. For a case of a multilayer construction, each layer can be constructed from a different elastomer composition. At this time, at least one layer of the multiple layers is made from the thermoplastic elastomer as above. A thickness of an entire elastomer film 3 is preferably 60 μm or less, and more preferably 50 μm or less, from a perspective of a soft texture and supple tracking of the body. The thickness of the entire elastomer film 3 is preferably 20 μm or more, and more preferably 30 μm or more, from the perspective of durability.

The nonwoven material 2 included in the elastic laminate sheet 1 and the first nonwoven material 2a and the second nonwoven material 2b that are included in the elastic laminate sheet 1' are described below. A fiber material that forms the nonwoven material 2, or forms the first nonwoven material 2a and the second nonwoven material 2b is not particularly restricted, and can be made from various types of fiber materials that are conventionally known. A blended fiber where polypropylene fibers, polyester fibers, and polyolefin fibers are blended and spun, or a concentric type composite fiber where a polyethylene terephthalate core is coated with polyethylene are preferable from a perspective of elasticity, softness, and favorable feel of the elastic laminate sheet 1 or 1' obtained. A spin blending ratio of the blended fibers containing a blend of polyester fibers and polyolefin fibers is not particularly restricted, but primarily using polyester fibers spin blended with polyolefin fibers is preferable, and a polyester fiber content is preferably 80 weight % or higher, more preferably 90 weight % or higher, from a perspective of elasticity.

A method of manufacturing the nonwoven material 2 or the first nonwoven material 2a and the second nonwoven material 2b is also not restricted. The nonwoven material can be manufactured from the aforementioned materials using a conventionally known manufacturing method. A spunbond method, a spunlace method, a thermal bond method, or the like are preferable from a perspective of providing favorable elasticity to the elastic laminate sheets 1 and 1'. The spunlace method can provide a favorable feel to the nonwoven material obtained.

The nonwoven material 2, the first nonwoven material 2a, and the second nonwoven material 2b can have a thickness from approximately 30 μm to 200 μm, but a thickness of 150 μm or less is preferable, and 80 μm or less is more preferable, in order to prevent becoming bulky and losing the soft texture, while maintaining a fabric texture. On the other hand, the thickness is preferably 30 μm or higher, more preferably 35 μm or higher, from the perspective of durability. Furthermore, a basis weight of the nonwoven material 2, first nonwoven material 2a, and second nonwoven material 2b can be from 10 to 50 $g/m^2$, but is preferably 40 $g/m^2$ or less, and more preferably 35 $g/m^2$ or less, from a perspective of softness. On the other hand, the basis weight is preferably 12 g/m² or higher, more preferably 15 g/m² or higher, from the perspective of durability.

A thickness of an entire elastic laminate sheet 1 or 1' can vary across a wide range depending on the application, but is generally within a range from approximately 50 μm to approximately 2 mm. The thickness of the entire elastic laminate sheet 1 or 1' is preferably from approximately 80 μm to approximately 1 mm, more preferably from approximately 90 μm to approximately 600 μm, from the perspective of softness.

A manufacturing method for the elastic laminate sheets 1 and 1' of the first and second embodiments is not particularly restricted. Examples include simultaneous extrusion lamination, extrusion lamination where adhesive lamination is performed in a manner that applies absolutely no pressure to the laminate sheet by a nip process, adhesion of a nonwoven material or fibers onto an elastomer film using an adhesive, forming a nonwoven material on a surface of an elastomer film using a melt blown method, thermal lamination of fibers or a nonwoven material on an elastomer surface, and the like.

Figure 8:
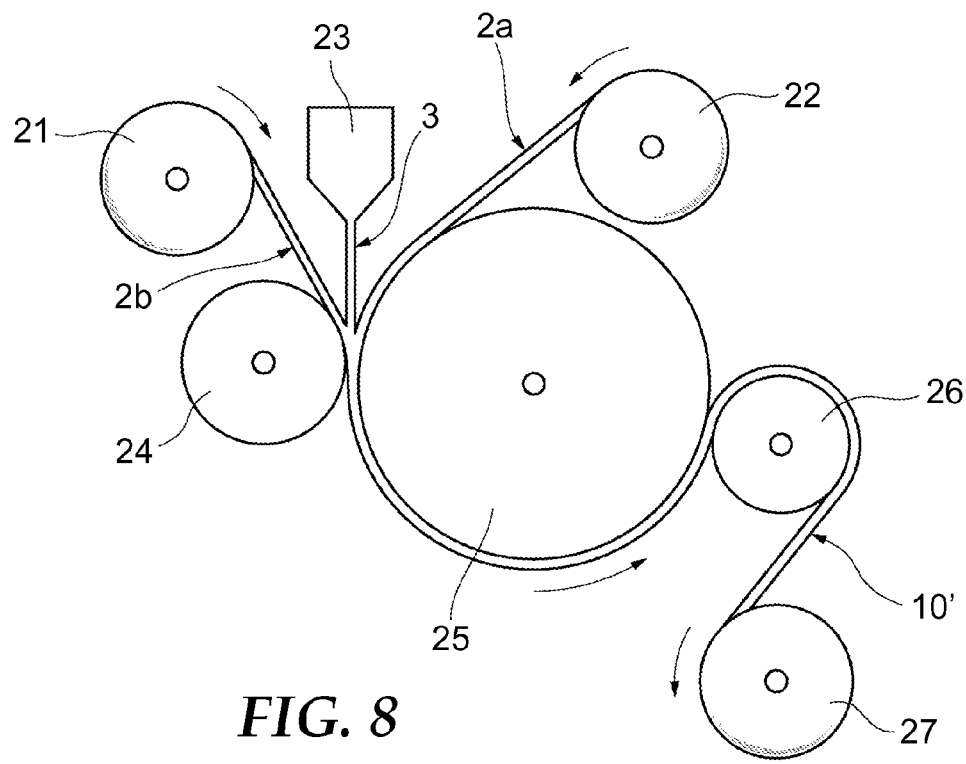
FIG. 8 is an example of a manufacturing method for the elastic laminate sheet according to the second embodiment.

The elastic laminate sheets 1 and 1' can be advantageously manufactured by a simultaneous melting extruding lamination method. The simultaneous melting extruding lamination method can be performed by a variety of processes. For example, the elastic laminate sheet 1' of the second embodiment can be manufactured by a series of processes as shown in FIG. 8.

The first nonwoven material 2a is unrolled from a supply roll 22, and is fed between a pair of lamination rollers 24 and 25 as shown by an arrow. On the other hand, the second nonwoven material 2b is unrolled from a supply roller 21, and is fed between a cooling roller 25 and a nip roller 24 as shown by an arrow. Note, the elastic laminate sheet 1 of the first embodiment can be manufactured by eliminating the supply roller 22. In this case, the nonwoven material 2 is on a nip roller 24 side, and the elastomer film 23 is on a cooling roller 25 side. Furthermore, the elastic laminate sheet 1' of the second embodiment can be manufactured by using both supply roller 21 and supply roller 22.

The cooling roller 25 can be formed from a calender roller with essentially a smooth surface. The elastomer film 3 is fed in a form of a molten stream from a die (normally a T-die) 23 that is connected to an extruder (not shown in the drawings), and is fed between the first nonwoven material 2a and the second nonwoven material 2b, where the film is cooled and hardened.

Figure 9:
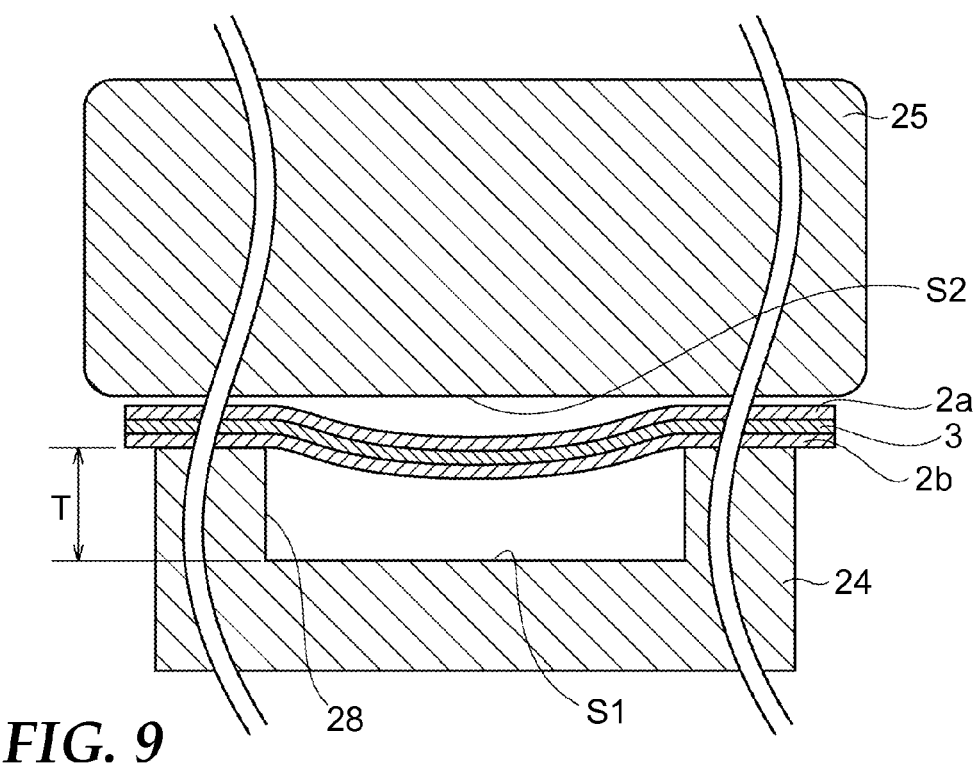
FIG. 9 is a cross section view illustrating an example of a condition where a melted elastomer film and a nonwoven material are bonded together using a chilled roller and a nip roller, in the manufacturing method for the elastic laminate sheet according to the second embodiment.

The nip roller 24 has at least one concave portion on a surface thereof, as illustrated in FIG. 9. Herein, a length in a longitudinal direction of a roller axis of the concave portion in the nip roller 24 is essentially same as a length in a CD direction of a high elasticity laminate portion in laminate sheet 10 or 10'. Furthermore, the nip roller 24 is constructed such that a depth T of a concave portion 28 formed in the nip roller 24 is always thicker across an entire surface of the concave portion in an axial direction of the roller than a thickness (H) of the entire elastic laminate sheet 1' (or elastic laminate sheet 1) made from the first nonwoven material 2a/elastomer film 3/second nonwoven material 2b (or nonwoven material 2/elastomer film 3), and a value T/H is preferably always 1.1 times or higher, more preferably 1.5 times or higher, and 100 times or less, more preferably 50 times or less. A design should be such that a distance between a bottom surface S1 of the concave portion 28 in the nip roller 24 and a surface S2 of the cooling roller 25 is preferably 1 mm or higher, more preferably 2 mm or higher, for a case where the thickness of the elastic laminate sheet 1' (or elastic laminate sheet 1) made from the first nonwoven material 2a/elastomer film 3/second nonwoven material 2b (or nonwoven material 2/elastomer film 3) is 50 μm, is preferably 1 mm or higher, more preferably 2 mm or higher for a case where the thickness of the elastic laminate sheet 1' (or elastic laminate sheet 1) is 200 μm, and is preferably 2.2 mm or higher, more preferably 3 mm or higher, for a case where the thickness of the elastic laminate sheet 1' (or elastic laminate sheet 1) is 2 mm. By using a nip roller 24 and a cooling roller 25 provided with concave portions 28 of this design, a region that is not subjected to direct pressure from the cooling roller 25 and the nip roller 24 can be formed in the laminate sheet 10' (or laminate sheet 10) obtained. This region corresponds to the elastic laminate sheet 1' according to the second embodiment (or the elastic laminate sheet 1 according to the first embodiment) where the first nonwoven material 2a and the second nonwoven material 2b (or the nonwoven material 2) and the elastomer film 3 are uniformly bonded with a specific strength.

The first nonwoven material 2a, the elastomer film 3, and the second nonwoven material 2b are uniformly adhered and laminated by the cooling roller 25 and the nip roller 24, as shown in the drawings. The sheet-like laminate sheet 10 obtained is fed in a direction shown by an arrow along an outer circumference of the cooling roller 25 by the roller 26. The elastic laminate sheet 10' (or laminate sheet 10) manufactured in this manner is made to change directions at the roller 26, and is then fed in a direction shown by an arrow and wound on a take-up reel 27.

First the laminate sheet 10' (or laminate sheet 10) which in one aspect of the present invention is manufactured by the aforementioned manufacturing method. The elastic laminate sheet 1' of the second embodiment can be obtained by cutting the high elasticity laminate portion of the laminate sheet 10' obtained to a predetermined shape and size. Similarly, the elastic laminate sheet 1 of the first embodiment can be obtained by cutting the high elasticity laminate portion of the laminate sheet 10 obtained to a predetermined shape and size.

The laminate sheet 10 and the elastic laminate sheet 1 (or the laminate sheet 10' and the elastic laminate sheet 1') obtained by this manufacturing method can be manufactured by simultaneously performing a step of manufacturing the elastomer film 3 and a step of laminating the elastomer film 3 and the nonwoven material 2 (or elastomer film 3 and the first nonwoven material 2a and the second nonwoven material 2b), and therefore cost performance is excellent.

If the elastomer film 3 is used as a multilayer elastomer film, the elastomer film 3 can be sent in the form of a multilayer molten stream from a die 23 using two or more extruders. At this time, at least one layer of the multiple layers is made from the thermoplastic elastomer. Note, layers other than thermoplastic elastomers can be simultaneously extruded for purposes of cost-reduction and adhesion to the nonwoven material, to an extent that the effect of the present invention is not lost. Examples of materials other than thermoplastic elastomers include polyethylene, polypropylene, and various other polyethylene based copolymers, such as ethylene-vinyl acetate copolymers, ethylene-maleic anhydride copolymers, ethylene-alpha olefin copolymers, and the like.

Furthermore, heat needling of the laminate sheets 10 or 10' and the elastic laminate sheets 1 or 1' obtained can be performed in order to provide permeability to moisture, and permeability to moisture can also be provided by appropriately perforating the laminate sheets 10 or 10' or elastic laminate sheet 1, 1' with fine holes.

Figure 10:
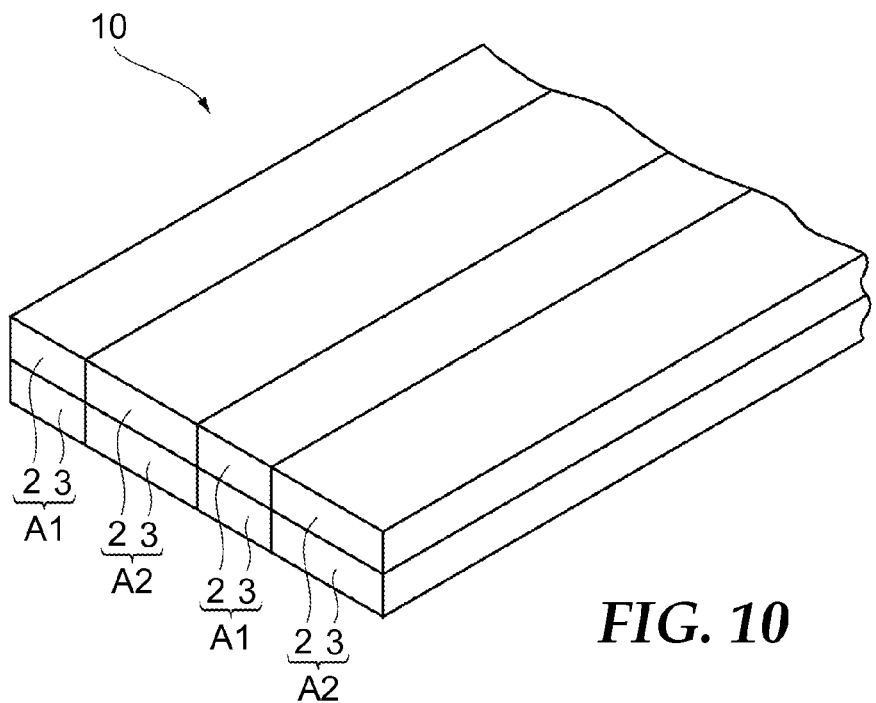
FIG. 10 is a perspective view of a laminate sheet having an elastic laminate sheet according to the first embodiment.
Figure 11:
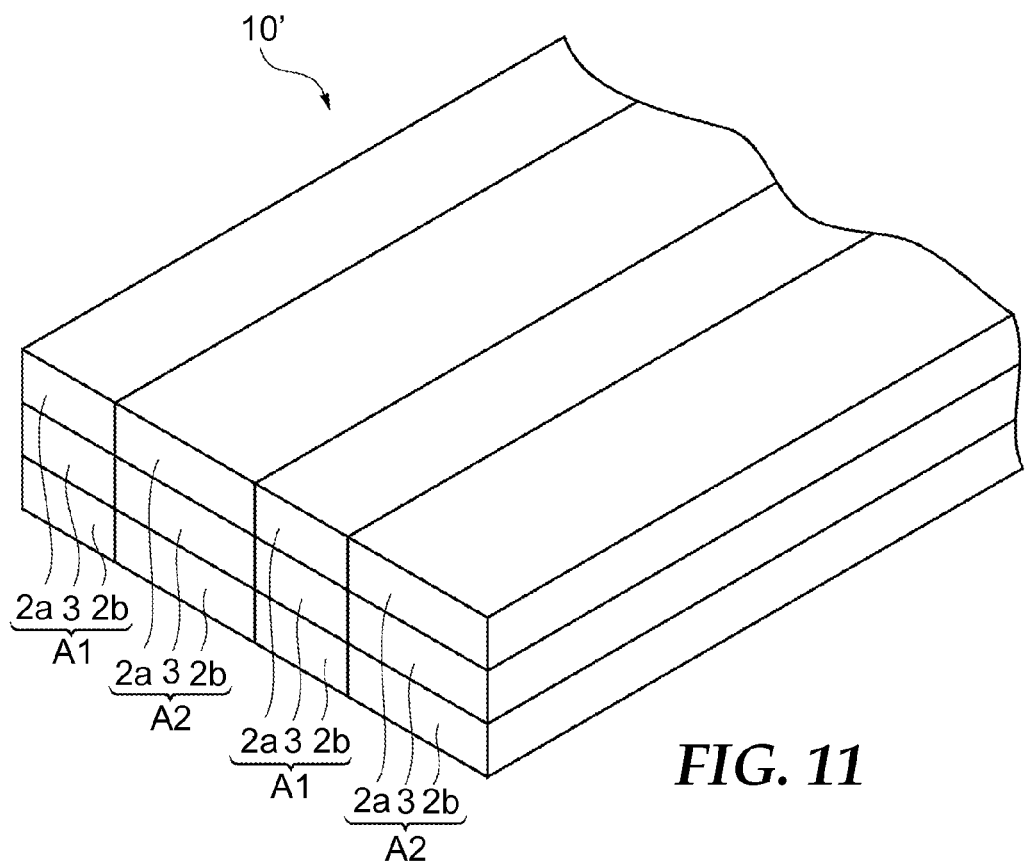
FIG. 11 is a perspective view of a laminate sheet having an elastic laminate sheet according to the second embodiment.

FIG. 10 is a perspective view illustrating an example of a laminate sheet 10 (with the two layer structure containing elastomer film 3/nonwoven material 2) obtained by the manufacturing method. With the laminate sheet 10, the elastic laminate sheet 1 according to the first embodiment contains an elastic laminate portion A2. FIG. 11 is a perspective view illustrating an example of a laminate sheet 10' (with a three layer construction of a first nonwoven material 2a/elastomer film 3/second nonwoven material 2b) wherein the elastic laminate sheet 1' according to the second embodiment contains an elastic laminate portion A2. In FIG. 10 and FIG. 11, the laminate sheet 10 or 10' contain an elastic laminate portion A2 and an elastic laminate portion A1 with elasticity that is lower than the elastic laminate portion A2, and A1 and A2 are arranged alternately in one direction. Hereinafter, the elastic laminate portion A2 is referred to as a "high elasticity laminate portion", and the elastic laminate portion A1 is referred to as a "low elasticity laminate portion" from a perspective that the elastic laminate portion A2 has relatively favorable elasticity as compared to the elastic laminate portion A1.

In this manner, the laminate sheet 10 has a low elasticity laminate portion and a high elasticity laminate portion having a two layer construction of elastomer film 3/nonwoven material 2; and the laminate sheet 10' has a low elasticity laminate portion and a high elasticity laminate portion having a three layer construction of a first nonwoven material 2a/elastomer film 3/second nonwoven material 2b. Herein, in the high elasticity laminate portion, the 50% return load of the elastomer film 3 after elongating 100% two times is 0.8 N/25 mm or higher, and the elastomer film 3 and the nonwoven material 2 (or the first nonwoven material 2a and the second nonwoven material 2b) are uniformly adhered with an adhesion strength of 4 N/25 mm or less. In other words, the high elasticity laminate portion has the same construction as the elastic laminate sheet 1 or 1' which is an embodiment of the present invention.

For example, if the high elasticity multilayer portions A2 and the low elasticity multilayer portions A1 are formed as strip regions parallel to a direction of flow of the sheet when the laminate sheet is manufactured (MD: Machine Direction), then the high elasticity multilayer portions A2 and the low elasticity multilayer portions A1 will be adjacent in a lateral direction perpendicular to the MD (CD: Cross Machine Direction). Furthermore, if the high elasticity laminate portions A2 and the low elasticity laminate portions A1 are formed as strip regions parallel to the direction (CD) perpendicular to the direction of flow (MD) of the sheet when the sheet is manufactured, the high elasticity laminate portions A2 and the low elasticity laminate portions A1 will be adjacent along the MD. However, the high elasticity laminate portions A2 and the low elasticity laminate portions A1 are not necessarily alternately adjacent in the laminate sheets 10, 10'.

In this manner, by appropriately providing low elasticity laminate portions in the laminate sheet, the favorable feel and softness of the high elasticity laminate portion can be maintained while positively securing to a main body portion of a hygienic article by the low elasticity laminate portion. Examples of a main body portion where the laminate sheet is used and secured in this manner include clothing such as underwear and the like, hygienic articles such as disposable diapers and the like (for example, ear portions of disposable diapers where a mechanical fastener is attached), elastic supporters, ear hooks for masks, and temperature retaining materials.

Furthermore, the elastic laminate sheet 1 or 1' is used as is in applications such as a hygienic article like a disposable diaper or disposable sanitary cap (such as the ear portions of a disposable diaper where a mechanical fastener is attached, or a head securing portion of a disposable sanitary cap), supporters, bandages, ear hooks for masks, temperature retaining materials, and the like.

EXAMPLES

The present invention will be explained in further detail below based on working examples and comparative examples, but the present invention is not limited to the following working examples.

Manufacturing a Laminate Sheet

Working Example 1

SIS copolymer containing 48 weight % of styrene ("Quintac SL-159", manufactured by Zeon Corporation) was used as a raw material for an elastomer film. a stretched core and sheath type thermobonded nonwoven material (concentric type composite fiber, PET core/PE sheath=50%/50%) (basis weight 20 g/m$^2$) was used as a nonwoven material.

Using a simultaneous melting extruding laminator illustrated in FIG. 8 and FIG. 9, an elastic laminate sheet made of an elastomer film and a nonwoven material was fabricated under the following lamination conditions; Melting temperature of elastomer in the extruder is 215° C., Nip pressure is 0.1 MPa, and distance between a bottom surface S1 of a concave portion 28 in a nip roller 24 and a surface S2 of a cooling roller 25 is 3 mm. Herein, the bottom surface S1 of the convex portion 28 in the nip roller 24 does not protrude and the nip surface ratio is 0%. The elastomer was introduced to a single screw extruder, and discharged from a T-die 23 such that the basis weight of the elastomer film obtained was 30 g/m$^2$. Next, immediately before the melted elastomer film was introduced in a gap between the cooling roller 25 and the nip roller 24, a separately manufactured nonwoven material 2 was inserted from a nip roller 24 side. The melted elastomer film and the nonwoven material were adhered together between the cooling roller 25 and the nip roller 24, and a laminate sheet with a two layer construction of nonwoven material/elastomer film was obtained by hardening the melted elastomer film. The sheet obtained was wound up on a take-up reel 27.

Working Example 2

The elastomer film raw material was introduced to a single screw extruder, and discharged from a T-die 23 such that the basis weight of the elastomer film obtained was 45 g/m$^2$. Furthermore, immediately before the melted elastomer film was inserted in a nip of a 3 mm gap between the cooling roller 25 and the nip roller 24, a separately manufactured first nonwoven material 2a and second nonwoven material 2b were inserted from the nip roller 24 and cooling roller 25 side. A laminate sheet with a three layer construction of nonwoven material/elastomer film/nonwoven material was obtained in a manner similar to Working Example 1, other than these conditions.

Working Example 3

A laminate sheet with a three layer construction of nonwoven material/elastomer film/nonwoven material was obtained in a manner similar to Working Example 2, except that stretchable core and sheath type thermobonded nonwoven material (concentric type composite fibers, PET core/PE sheath=50%/50%, basis weight 24 g/m$^2$) was used as the nonwoven material.

Working Example 4

A laminate sheet with a three layer construction of nonwoven material/elastomer film/nonwoven material was obtained in a manner similar to Working Example 2, except that stretchable thermobonded nonwoven material (polypropylene 100%) with a basis weight of 22 g/m$^2$ was used as the nonwoven material.

Working Example 5

A laminate sheet with a three layer construction of nonwoven material/elastomer film/nonwoven material was obtained in a manner similar to Working Example 2, except that stretchable core and sheath type thermobonded nonwoven material (polypropylene 100%) with a basis weight of 24 g/m$^2$ was used as the nonwoven material.

Working Example 6

A laminate sheet with a three layer construction of nonwoven material/elastomer film/nonwoven material was obtained in a manner similar to Working Example 2, except that stretchable core and sheath type thermobonded nonwoven material (polypropylene 100%) with a basis weight of 27 g/m$^2$ was used as the nonwoven material.

Working Example 7

The elastomer film raw material was introduced to a single screw extruder, and discharged from a T-die 23 such that the basis weight of the elastomer film obtained was 50 g/m$^2$. Furthermore, a blended fiber (blending ratio—polyester fiber: polypropylene fiber=90:10) with a basis weight of 32 g/m$^2$ was used as the nonwoven material. A laminate sheet with a three layer construction of nonwoven material/elastomer film/nonwoven material was obtained in a manner similar to Working Example 2, other than these conditions.

Working Example 8

An ethylene-propylene (EP) copolymer containing 17 weight % of ethylene ("VistaMaxx 6102" product of Exxon Mobil (USA)) was used as the raw material for the elastomer film. Furthermore, elastomer film raw material was introduced to a single screw extruder, and discharged from a T-die 23 such that the basis weight of the elastomer film obtained was 55 g/m$^2$. A laminate sheet with a two layer construction of nonwoven material/elastomer film was obtained in a manner similar to Working Example 1, other than these conditions.

Working Example 9

The elastomer film raw material was introduced to a single screw extruder, and discharged from a T-die 23 such that the basis weight of the elastomer film obtained was 45 g/m$^2$. Furthermore, immediately before the melted elastomer film was inserted in the nip of the 3 mm gap between the cooling roller 25 and the nip roller 24, a separately manufactured first nonwoven material 2a and second nonwoven material 2b were inserted from the nip roller 24 and cooling roller 25 side. A laminate sheet with a three layer construction of nonwoven material/elastomer film/nonwoven material was obtained in a manner similar to Working Example 8, other than these conditions.

Working Example 10

An ethylene-propylene (EP) copolymer containing 17 weight % of ethylene ("VistaMaxx 6102" product of Exxon Mobil (USA)) was used as the raw material for the elastomer film. Stretchable thermobonded nonwoven material (polypropylene 100%) with a basis weight of 22 g/m$^2$ was used as the nonwoven material. Furthermore, elastomer film raw material was introduced to a single screw extruder, and discharged from a T-die 23 such that the basis weight of the elastomer film obtained was 54 g/m$^2$. A laminate sheet with a three layer construction of nonwoven material/elastomer film/nonwoven material was obtained in a manner similar to Working Example 2, other than these conditions.

Working Example 11

An ethylene-propylene (EP) copolymer containing 17 weight % of ethylene ("VistaMaxx 6102" product of Exxon Mobil (USA)) was used as the raw material for the elastomer film. A stretchable spunlace nonwoven material (basis weight: 32 g/m$^2$) made of blended fiber (blending ratio—polyester fiber: polypropylene fiber=90:10) was used as the nonwoven material. Furthermore, elastomer film raw material was introduced to a single screw extruder, and discharged from a T-die 23 such that the basis weight of the elastomer film obtained was 45 g/m$^2$. A laminate sheet with a two layer construction of nonwoven material/elastomer film was obtained in a manner similar to Working Example 1, other than these conditions.

Working Example 12

75 weight % of SIS copolymer containing 44 weight % of styrene ("Vector 4411" product of DEXCO Polymers (USA)) and 25 weight % of an SIS copolymer containing 17 weight % styrene ("D1117", product of Kraton Polymers (USA)) were blended together to make an SIS copolymer blend with the styrene content of 37.3 weight %, which was used as the elastomer film raw material. Stretchable core and sheath type thermobonded nonwoven material (concentric type composite fibers, PET core/PE sheath=50%/50%, basis weight 24 g/m$^2$) was used as the nonwoven material. A laminate sheet with a three layer construction of nonwoven material/elastomer film/nonwoven material was obtained in a manner similar to Working Example 2, other than these conditions.

Working Example 13

A stretchable spunlace nonwoven material (basis weight: 32 g/m$^2$) made of blended fiber (blending ratio—polyester fiber: polypropylene fiber=90:10) was used as the nonwoven material. Furthermore, elastomer film raw material was introduced to a single screw extruder, and discharged from a T-die 23 such that the basis weight of the elastomer film obtained was 50 g/m$^2$. A laminate sheet with a three layer construction of nonwoven material/elastomer film/nonwoven material was obtained in a manner similar to Working Example 12, other than these conditions.

Comparative Example 1

A round dot nip roller where the distance between the bottom surface 51 of the concave portion 28 in the nip roller 24 and the surface S2 of the cooling roller 25 was 1 mm, round dot protrusions were formed on the bottom surface 51, and the nip surface ratio was 40%, was used as the nip roller 24. A laminate sheet with a two layer construction of nonwoven material/elastomer film was obtained in a manner similar to Working Example 2, other than these conditions.

Comparative Example 2

A laminate sheet with a three layer construction of nonwoven material/elastomer film/nonwoven material was obtained in a manner similar to Working Example 2, except that the distance between the bottom surface S1 of the concave portion 28 in the nip roller 24 and the surface S2 of the cooling roller 25 was 1 mm.

Comparative Example 3

SIS copolymer containing 17 weight % of styrene ("D1117", manufactured by Krayton Polymer) was used as the raw material for the elastomer film. The elastomer film raw material was introduced to a single screw extruder, and discharged from a T-die 23 such that the basis weight of the elastomer film obtained was 54 g/m$^2$. A laminate sheet with a three layer construction of nonwoven material/elastomer film/nonwoven material was obtained in a manner similar to Working Example 2, other than these conditions.

Comparative Example 4

SIS copolymer containing 17 weight % of styrene ("D1117", manufactured by Krayton Polymer) was used as the raw material for the elastomer film. The elastomer film raw material was introduced to a single screw extruder, and discharged from a T-die 23 such that the basis weight of the elastomer film obtained was 110 g/m$^2$. A laminate sheet with a three layer construction of nonwoven material/elastomer film/nonwoven material was obtained in a manner similar to Working Example 2, other than these conditions.

Comparative Example 5

A commercial diaper was purchased and the elastic laminate sheet which formed ear portions where a mechanical fastener is attached was cut off. The construction of the elastic laminate sheet was a three layer structure of nonwoven material/elastomer film/nonwoven material. The nonwoven material was strongly and uniformly adhered to the elastomer film (peel strength on the nip roller side: 4.3 N/25 mm, peel strength on the cooling roller side: 5.2 N/25 mm). Furthermore, the basis weight of the elastomer film was 70 g/m$^2$. Overall, the elastic laminate sheet was hard.

Comparative Example 6

A commercial diaper was purchased and the elastic laminate sheet which formed ear portions where a mechanical fastener is attached was cut off. The composition of the elastic laminate sheet was a construction with a nonwoven material/stripe coat adhesive in the MD direction/elastomer film/stripe coat adhesive in the MD direction/nonwoven material. The nonwoven material was noncontiguously present and attached by a stripe coat adhesive in the MD direction applied at intervals on the elastomer film surface. In other words, in the elastic laminate sheet, the surface of the elastomer film was exposed as is except in the regions where the nonwoven material and the elastomer film surface were locally bonded together by an adhesive that was applied at intervals on the surface of the elastomer film, and in particular, pronounced exposure of the elastomer film was observed when stretched. The surface appearance of the elastic laminate sheet was inferior.

50% Return Load of Elastomer Film after 100% Elongating Two Times

A 50% return load of the elastomer film after elongating 100% two times was measured for Working Examples 1 through 13 and Comparative Examples 1 through 6 by the following method.

This measurement was performed by fabricating test samples indoors where the temperature was maintained at 23±2° C. and the humidity was maintained at 50±5%, and then measuring after allowing to sit for 1 hour. The elastic laminate sheet test sample was cut by measuring the dimensions using a stainless steel ruler (manufactured by Shinwa), placing the same ruler on the test sample to be cut, and cutting with a knife (Feather S Seikan single edged blade, blade thickness: 0.245 mm).

The elastic laminate sheet test sample was cut in a rectangle 50 mm long in a direction of elongation of the elastomer film (CD during sheet fabrication) and 25 mm wide in a direction perpendicular to the direction of elongation, and then the nonwoven material was peeled from the elastomer film. When the nonwoven material is peeled from the elastomer film, the elastomer film is prevented from stretching beyond 3 mm. As illustrated in FIG. 3, two pieces of sealing material 31 and 32 (Scotch™ Premium Grade Filament Tape manufactured by 3M, part number "898, width 25 mm") cut to length of 40 mm were applied to both short ends of the test sample on the surface of the elastomer film from which the nonwoven material was peeled. For a case of an elastic laminate sheet with a two layer construction of nonwoven material/elastomer film, two pieces of tape 33 and 34 (Scotch™ Premium Grade Filament Tape manufactured by 3M, part number "898") cut to a length of 40 mm were applied to the elastomer film surface without the nonwoven material such that adhesive surfaces overlapped with those of the sealing materials 31 and 32 that were applied to the surface of the elastomer film where the nonwoven material on the opposite side has already been peeled off. Furthermore, the sealing materials 31 through 34 were applied such that the length of the test sample in the CD direction after applying the sealing material was 25 mm. For a case of an elastic laminate sheet with a three layer construction of nonwoven material/elastomer film/nonwoven material, the nonwoven material present on both surfaces is peeled from the elastomer film, and as described above, two pieces of tape 31 and 32 (Scotch™ Premium Grade Filament Tape manufactured by 3M, part number "898, width 25 mm") cut to a length of 40 mm and two pieces of tape 33 and 34 (Scotch™ Premium Grade Filament Tape manufactured by 3M, part number "898") cut to a length of 40 mm were applied to both surfaces of the elastomer film from which the nonwoven material had been peeled off, such that adhesive surfaces overlapped with those of the sealing materials 31 and 33 and sealing materials 32 and 34 and the length of the test sample was 25 mm in the CD direction.

As illustrated in FIG. 4, the sealing material applied portions of the fabricated test sample are attached to an upper operating chuck 35 and lower fixed chuck 36 of a Tensilon tester (model RTG-1225, manufactured by Orientec Co., Ltd.). At that time, the distance between chucks was adjusted to 25 mm by the operating chuck located at the top, and then the chucks were secured so there was no tension. The chucks had a shape with a width of 25 mm or more and a height of 25 mm or more. After securing, the elastomer film was checked to ensure that there were no wrinkles or twisting. The test sample was elongated upward 25 mm at a rate of 300 mm/minute, and then the test sample was returned to the original chuck distance at a rate of 300 mm/minute. After returning to the initial position, the attachment to the chuck was once released and then the test sample was removed. As illustrated in FIG. 3 (b), the test sample was again sealed by applying the sealing material 31' (33') and 32' (34') onto the sealing material 31 (33) and 32 (34). As illustrated in FIG. 5, the measurement test sample was secured to fit between the chucks (attaching portions) of the tensile strength tester that were spaced 25 mm apart from each other which was the first tensile range (when attaching, loading is prevented from being applied to the measurement test sample). The measurement test sample was elongated by 25 mm at a rate of 300 mm/minute, and then the elongation distance was returned 12.5 mm. The load (N/25 mm) was continuously recorded, and during the second return, the return load at an elongation distance of 12.5 mm (distance between chucks of 37.5 mm) was evaluated as the 50% return load after elongating 100% two times.

Peel Strength Between Elastomer Film and Nonwoven Material (Adhesive Strength)

This measurement was performed by fabricating test samples indoors where the temperature was maintained at 23±2° C. and the humidity was maintained at 50±5%, and then measuring after allowing to sit for 1 hour. The test sample was cut by measuring the dimensions using a stainless steel ruler (manufactured by Shinwa), placing the ruler on the test sample to be cut, and cutting with a knife (Feather S Seikan single edged blade, blade thickness: 0.245 mm).

Test Sample Fabrication

An elastic laminate sheet test sample (three layer construction of nonwoven material/elastomer film/nonwoven material, or two layer construction of nonwoven material/elastomer film) was cut to a width of 45 mm (elongation direction (CD direction during sheet fabrication)) and a length of 80 mm (direction orthogonal to the elongation direction ((MD direction during sheet fabrication)).

Elongation of Test Sample

As illustrated in FIG. 6, a test fixture was prepared that clamps 10 mm from both long end portions of the test sample. The fixture was made by preparing stainless steel panels 41, 42, 43, and 44 with a width of 52 mm, a length of 100 mm, and a thickness of 2 mm, and then applying surface fasteners 45, 46, 47, and 48 (mechanical fastener manufactured by 3M, part number "NZ-2141", width 25 mm) onto a sufficiently wide flat surface of one long edge of each of the stainless steel panels.

Two long edges of the test sample were clamped to 10 mm by the stainless steel panels with surface fasteners, and then the test sample was elongated by 10 mm in the elongation direction at a rate of 50 mm/minute, and then returned to the original width at the same rate.

The portion of the elongated test sample that was clamped by the test panels was removed, and then the test sample was cut to a width of 25 mm (elongation direction) and a length of 80 mm (elongation direction).

Peel Strength Measurement

As illustrated in FIG. 7, the laminated nonwoven material was peeled from the elastomer film to a distance of 20 mm in parallel from one end of the short edge of the test sample. If the width of the nonwoven material was increased after peeling, the width was returned to the pre-peeling width of 25 mm.

If the elastic laminate sheet has a two layer construction of nonwoven material/elastomer film, Japanese paper tape (planar paper masking tape 243J manufactured by 3M, part number "243 JDIY-24") was applied to the elastomer film surface without the nonwoven material such that the tape did not protrude from the test sample.

If the elastic laminate sheet has a three layer construction of nonwoven material/elastomer film/nonwoven material, Japanese paper tape (planar paper masking tape 243J manufactured by 3M, part number "243 JDIY-24") was applied to the surface of the nonwoven material that was not peeled, such that the tape did not protrude from the test sample.

The end portion of the peeled nonwoven material was fastened between two pieces of nonwoven material fastening tape 51 and 52 (Scotch™ Premium Grade Filament Tape manufactured by 3M, part number "898 with 25 mm") that was cut to a length of 30 mm, to a point 10 mm in parallel from the peeled nonwoven material end portion. Nonwoven material fastening tape 53 and 54 (Scotch™ Premium Grade Filament Tape manufactured by 3M, part number "898 with 25 mm") was applied to the nonwoven material end portion in the region for the unpeeled portion as well.

The test sample was attached without stress to the Tensilon tester (model number RTG-1225, manufactured by Orientec Co., Ltd.) such that the distance between chucks was 20 mm. The chucks had a shape with a width of 25 mm or more and a height of 25 mm or more. At this time, the nonwoven material fastening tape 51 and 52 that was applied to the ends of the peeled nonwoven material was fastened to the operating chuck such that the tape did not protrude from the bottom portion of the operating chuck located at the top. Furthermore, the layers remaining after peeling the nonwoven material (layers including elastomer film/Japanese paper tape, or layers including elastomer film/nonwoven material/Japanese paper tape) were attached to the bottom fixed chuck 10 mm from the end portion.

The peel strength when the operating chuck was pulled upward at a rate of 500 mm/minute was recorded. At this time, the angle of the surface of the test sample made of nonwoven material/elastomer film/nonwoven material/Japanese paper tape, or nonwoven material/elastomer film/Japanese paper tape with regards to the test sample plane that forms the peel interface of the nonwoven material and the elastomer film from the bottom fixed chuck of the tensilon tester is maintained at approximately 60°.

An integrated average of the recorded tension (N/25 mm) data for the 25 mm starting at 15 mm from the start of tension to 40 mm from the start of tension was taken as an adhesive strength.

The integrated average is expressed by the following equation when the adhesive strength f(x) (N/25 mm) is continuous across a measurement length from a to b (a<x<b) (a=15 mm, b=40 mm).

[Equation 2]

$$\langle f \rangle_{(a,b)} = \frac{\int_a^b f(x)\,dx}{b-a} \quad (1)$$

Note, f(x) is acquired from the tension recorded by the Tensilon tester.

With the present embodiment, the adhesive strength determined above is measured five times using the same test sample, and the average value is used as the adhesive strength.

If the elastic laminate sheet has a three layer construction of nonwoven material/elastomer film/nonwoven material, the entire surface of the nonwoven material on the opposite side as the nonwoven material where the peel strength was measured is processed by the same method to attain the measurement sample. The adhesive strength measurement was analyzed again to determine the adhesive strength.

The details of the elastomer film and nonwoven material that were used in Working Examples 1 through 13 and the comparative Examples 1 through 6, as well as the 50% return load after elongating 100% two times for the elastomer film, and the measurement results for the adhesive strength are shown in Tables 1 through 3.

TABLE 1

| | | Working Examples | | | | | | |
|---|---|---|---|---|---|---|---|---|
| | | 1 | 2 | 3 | 4 | 5 | 6 | 7 |
| Nonwoven material | Type | Composite fiber | Composite fiber | Composite fiber | Polypropylene 100% | Polypropylene 100% | Polypropylene 100% | Blended fiber |
| | Basis weight (g/m²) | 20 | 20 | 24 | 22 | 24 | 27 | 32 |
| Elastomer | Type | SIS SL-159 | SIS SL-159 | SIS SL-159 | SIS SL-159 | SIS SL-159 | SIS SL-159 | SIS SL-159 |
| | Styrene weight % | 48 | 48 | 48 | 48 | 48 | 48 | 48 |
| | Ethylene weight % | — | — | — | — | — | — | — |
| | Basis weight (g/m²) | 30 | 45 | 45 | 45 | 45 | 45 | 50 |
| | 50% return load after elongating two times (N/25 mm) | 0.85 | 1.20 | 1.20 | 1.05 | 1.10 | 1.05 | 1.01 |
| Adhesive strength (N/25 mm) | Nip roller side | 2.1 | 2.1 | 2.3 | 2.3 | 2.3 | 2.3 | 2.3 |
| | Cooling roller side | — | 3.3 | 3.8 | 2.8 | 3.5 | 3.5 | 3.5 |

TABLE 2

| | | Working Examples | | | | | |
|---|---|---|---|---|---|---|---|
| | | 8 | 9 | 10 | 11 | 12 | 13 |
| Nonwoven material | Type | Composite fiber | Composite fiber | Polypropylene 100% | Blended fiber | Composite fiber | Blended fiber |
| | Basis weight (g/m²) | 20 | 20 | 22 | 32 | 24 | 32 |
| Elastomer | Type | TPO VistaMaxx 6102 | TPO VistaMaxx 6102 | TPO VistaMaxx6102 | TPO VistaMaxx6102 | SIS V4411/D1117 | SIS V4411/D1117 |
| | Styrene weight % | — | — | — | — | 37.3 | 37.3 |
| | Ethylene weight % | 17 | 17 | 17 | 17 | — | — |
| | Basis weight (g/m²) | 55 | 45 | 54 | 45 | 45 | 50 |
| | 50% return load after elongating two times (N/25 mm) | 1.10 | 1.20 | 1.30 | 1.11 | 0.90 | 0.90 |
| Adhesive strength (N/25 mm) | Nip roller side | 2.5 | 3.2 | 3.3 | 2.0 | 2.7 | 1.7 |
| | Cooling roller side | — | 3.5 | 3.7 | — | 3.6 | 3.3 |

TABLE 3

| | | Comparative Examples | | | | | |
|---|---|---|---|---|---|---|---|
| | | 1 | 2 | 3 | 4 | 5 | 6 |
| Nonwoven material | Type | Composite fiber | Composite fiber | Composite fiber | Composite fiber | — | — |
| | Basis weight (g/m²) | 20 | 20 | 20 | 20 | — | — |
| Elastomer | Type | SIS SL-159 | SIS SL-159 | SIS D1117 | SIS D1117 | — | — |
| | Styrene weight % | 48 | 48 | 17 | 17 | — | — |
| | Ethylene weight % | — | — | — | — | — | — |
| | Basis weight (g/m²) | 45 | 45 | 54 | 110 | 80 | 65 |
| | 50% return load after elongating | 1.05 | 1.05 | 0.30 | 0.85 | 1.00 | 0.80 |

TABLE 3-continued

|  |  | Comparative Examples | | | | | |
|---|---|---|---|---|---|---|---|
|  |  | 1 | 2 | 3 | 4 | 5 | 6 |
| Adhesive strength (N/25 mm) | two times (N/25 mm) Nip roller side | 5.5 | 4.3 | 2.0 | 3.5 | 4.3 | 3.6 |
|  | Cooling roller side | 8.3 | 5.5 | 3.3 | 3.7 | 5.2 | 3.7 |

Softness of Elastic Laminate Sheet Softness of the elastic laminate sheet was measured by the following method, and evaluated using the following criteria.

Loop Stiffness Test

Elastic laminate sheet test pieces (width 25 mm×length 80 to 100 mm) were fabricated. Each of the test pieces was placed on a table of a stiffness tester (loop stiffness meter, manufactured by Toyo Seiki), both ends on the short end side of each test piece were secured by a fixture (fixture height 5 mm), and the length of each test piece that formed a loop in conjunction with movement of the fixture was 60 mm.

The switch to the stiffness tester was turned on, the fixtures were automatically made to slide from the edge to the center portion of the table, and the test pieces were made to form a loop. Next, the table where the looped test pieces are attached was tipped sideways 90°, a sensor attached to the stiffness tester was made to contact with a tip end of the looped test pieces in order to flatten the tip end of the looped test pieces, and then the sensor was moved at a rate of 200 mm/minute in a direction that flattened the test piece loops (perpendicular direction to the table).

A maximum value was recorded for a load when the loop height of the test pieces was flattened to 6.5 mm (distance from the fixture surface on the loop side to the tip and of the looped test piece). The same measurement was repeated six times, an average value was taken, and evaluated as described below.

0.001 to 0.040 N/25 mm: Very soft
0.040 to 0.060 N/25 mm: Soft
0.060 N/25 mm or higher: Not soft Appearance of Elastic Laminate Sheet An appearance of the elastic laminate sheet was observed by the following method, and evaluated using the following criteria.

A visual sensory test was performed in order to evaluate whether or not the appearance was pleasing.

An elastic laminate sheet test piece (width 35 mm or more×length 35 mm or more) was fabricated, and placed on a table in a 50% elongated condition with regard to the direction of stretching. Two 15 W florescent lamps were placed at a height between 60 cm and 100 cm from the test piece, the lamps were turned on, and the test piece was visually observed from above.

Elastomer film and nonwoven material maintain a uniformly adhered condition: Pass Exposure of the elastomer film is observed in a band (contiguous) in the direction perpendicular to the direction of stretching of the test piece: Fail 50% Return Load of the Elastic Laminate Sheet after Elongating 100% Two Times The 50% return load of the elastomer film after elongating 100% two times of the elastic laminate sheets obtained in Working Examples 1 through 13 and Comparative Examples 1 through 6 was measured by the same measurement method.

The physical properties of the elastic laminate sheets obtained in Working Examples 1 through 13 and Comparative Examples 1 through 6 are shown in Tables 4 through 6.

TABLE 4

|  | Working Examples | | | | | | |
|---|---|---|---|---|---|---|---|
|  | 1 | 2 | 3 | 4 | 5 | 6 | 7 |
| Softness | Very soft | Very soft | Soft | Very soft | Soft | Soft | Soft |
| Appearance | Pass | Pass | Pass | Pass | Pass | Pass | Pass |
| Laminate test sample 50% load during second return | 0.98 | 1.25 | 1.20 | 1.16 | 0.78 | 1.16 | 0.99 |

TABLE 5

|  | Working Examples | | | | | |
|---|---|---|---|---|---|---|
|  | 8 | 9 | 10 | 11 | 12 | 13 |
| Softness | Very soft | Very soft | Very soft | Very Soft | Soft | Soft |
| Appearance | Pass | Pass | Pass | Pass | Pass | Pass |
| Laminate test sample 50% load during second return | 1.23 | 1.25 | 1.47 | 0.80 | 0.87 | 0.93 |

TABLE 6

|  | Comparative Examples | | | | | |
|---|---|---|---|---|---|---|
|  | 1 | 2 | 3 | 4 | 5 | 6 |
| Softness | Not soft | Not soft | Soft | Not soft | Not soft | Soft |
| Appearance | Pass | Pass | Pass | Fail | Pass | Fail |
| Laminate test sample 50% load during second return | 1.16 | 1.16 | 0.40 | 0.85 | 1.40 | 0.85 |

Elastic laminate sheets according to Working Examples 1 through 13 where the 50% return load of the elastomer film after elongating 100% two times was 0.8 N/25 mm or higher and where the elastomer film and the nonwoven material were uniformly adhered with an adhesive strength of 4 N/25 mm or less, were soft, had favorable appearance, and had excellent elasticity.

What is claimed is:

1. An elastic laminate sheet comprising a laminate body having an elastomer film and a nonwoven material,
    wherein a 50% return load of the elastomer film after elongating 100% two times is 0.8 N/25 mm or higher; and
    the elastomer film and the nonwoven material are laminated together in the absence of pressure and are uniformly bonded with a bonding strength of 4 N/25 mm or less.

2. The elastic laminate sheet according to claim 1, wherein nonwoven material is provided on both sides of the elastomer film.

3. The elastic laminate sheet according to claim 1, wherein a basis weight of the elastomer film is 60 g/m$^2$ or less.

4. A laminate sheet comprising a laminate body having an elastomer film and a nonwoven material provided on at least one surface of the elastomer film,
    wherein the laminate sheet contains a low elasticity laminate portion and a high elasticity laminate portion; and in the high elasticity laminate portion,
    a 50% return load of the elastomer film after elongating 100% two times is 0.8 N/25 mm or higher, and the elastomer film and the nonwoven material are laminated together in the absence of pressure and are uniformly bonded with a bonding strength of 4 N/25 mm or less.

5. The laminate sheet according to claim 4, wherein nonwoven material is provided on both sides of the elastomer film.

6. The laminate sheet according to claim 4, wherein a basis weight of the elastomer film is 60 g/m$^2$ or less.

7. An article comprising the elastic laminate sheet according to claim 1.

8. An article comprising the laminate sheet according to claim 4.

* * * * *

UNITED STATES PATENT AND TRADEMARK OFFICE
CERTIFICATE OF CORRECTION

| | |
|---|---|
| PATENT NO. | : 9,434,130 B2 |
| APPLICATION NO. | : 14/004559 |
| DATED | : September 6, 2016 |
| INVENTOR(S) | : Kioshi Kunihiro |

It is certified that error appears in the above-identified patent and that said Letters Patent is hereby corrected as shown below:

In the Specification

<u>Column 12</u>
Line 24, delete "film." and insert -- film, --, therefor.

<u>Column 15</u>
Line 4, delete "51" and insert -- S1 --, therefor.
Line 6, delete "51," and insert -- S1, --, therefor.
Line 24, delete "Krayton" and insert -- Kraton --, therefor.
Line 36, delete "Krayton" and insert -- Kraton --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*